(12) United States Patent
Haines et al.

(10) Patent No.: US 10,837,580 B2
(45) Date of Patent: Nov. 17, 2020

(54) FLEXIBLE AIR CONDITIONING BARRIER OR VENEER SUCTION HOSE

(71) Applicant: ContiTech Schlauch GmbH, Hannover (DE)

(72) Inventors: Bradley James Haines, Sun Prairie, WI (US); Brian Henry, Sun Prairie, WI (US)

(73) Assignee: ContiTech Schlauch GmbH, Hannover (DE)

( * ) Notice: Subject to any disclaimer, the term of this patent is extended or adjusted under 35 U.S.C. 154(b) by 126 days.

(21) Appl. No.: 16/124,317

(22) Filed: Sep. 7, 2018

(65) Prior Publication Data
US 2020/0080668 A1 Mar. 12, 2020

(51) Int. Cl.
*F16L 11/10* (2006.01)
*F16L 11/12* (2006.01)

(52) U.S. Cl.
CPC ............... *F16L 11/10* (2013.01); *F16L 11/12* (2013.01)

(58) Field of Classification Search
CPC .. F16L 11/10; F16L 11/04; F16L 11/20; F16L 11/081
USPC ............. 138/123–126, 137; 428/36.91, 36.9
See application file for complete search history.

(56) References Cited

U.S. PATENT DOCUMENTS

| | | | |
|---|---|---|---|
| 6,941,975 B2 | 9/2005 | Wilson et al. | |
| 7,478,654 B2 | 1/2009 | Haines | |
| 2005/0008807 A1 | 1/2005 | Wilson et al. | |
| 2007/0048475 A1 | 3/2007 | Haines | |
| 2010/0300571 A1* | 12/2010 | Miller | B32B 5/02 138/137 |
| 2011/0290362 A1* | 12/2011 | Weil | F16L 11/083 138/129 |
| 2012/0090720 A1 | 4/2012 | Burrowes et al. | |
| 2013/0327434 A1* | 12/2013 | Kawai | C08J 3/203 138/137 |
| 2014/0116562 A1 | 5/2014 | Haines et al. | |
| 2015/0075665 A1 | 3/2015 | Henry | |

* cited by examiner

*Primary Examiner* — Patrick F Brinson
(74) *Attorney, Agent, or Firm* — Gregory Adams; David Cate

(57) ABSTRACT

Refrigerant hoses include a permeation inhibiting layer, wherein the permeation inhibiting layer is formed of mixture based upon a polyether-ester block copolymer, a polyamide-polyether block copolymer, or a blend thereof. A tie layer surrounds the permeation inhibiting layer, and the tie layer is based on a butyl rubber. A reinforcing layer surrounds the tie layer, and a cover layer is disposed adjacent the reinforcing layer. In some cases, an innermost rubber tube is disposed inwardly adjacent the permeation inhibiting layer, and the innermost rubber tube is comprised of rubbery polymer. The refrigerant hoses may further include a second tie layer surrounding the reinforcing layer, and a second spiral reinforcing layer disposed between the cover layer and the second tie layer. Furthermore, the hoses may have a permeation rate of not greater than 0.0020 g/cm/day of R-1234yf refrigerant.

20 Claims, 4 Drawing Sheets

FLEXIBLE AIR CONDITIONING BARRIER OR VENEER SUCTION HOSE

FIELD

The field to which the disclosure generally relates is a hose suitable for use in refrigerant systems such as vehicle, industrial, and residential refrigerant systems, such as automotive air conditioning systems. The hose is a combination of elastomeric materials to provide flexibility and thermoplastic materials to provide sufficiently low permeability.

BACKGROUND

This section provides background information to facilitate a better understanding of the various aspects of the disclosure. It should be understood that the statements in this section of this document are to be read in this light, and not as admissions of prior art.

Hoses are used for transporting refrigerants in vehicle air conditioning systems, as well as industrial and residential refrigerant systems. Such hoses serve the purpose of joining the principal operating components of the refrigerating device. The hoses are typically designed to have good flexibility, high strength, the ability to bend to small radii without kinking, and to maintain impermeability to the fluids resident therein.

In some applications, such as automobiles or trucks, the refrigeration hoses are subjected to temperature extremes in under-the-hood applications and accordingly, must be capable of providing a long service life in an environment under which they are repeatedly subjected to both high and low temperatures. The normal operating temperatures encountered by air conditioning hose assemblies employed in automotive and truck air conditioning applications generally range from about −30° C. to about 120° C. Typical design specifications call for such refrigerant hose to be capable of withstanding operation temperatures which are within the range of about −40° C. to 150° C. The higher temperatures are due mainly to the location of the system proximate to the engine as well as from the heat generated in compressing the refrigerant as a gas. Additionally, such hoses must be capable of being tightly attached to refrigeration device components in a leak proof fashion (meeting requirements for proper coupling attachment).

Suction hoses on air conditioning systems typically have a very large inner diameter (ID), which can become large conduits for transmitting noise and vibration from the engine to the evaporator in the passenger compartment. Because the high flexural modulus of nylon extrusions typically used are very high, even in very highly plasticized and/or highly modified grades, the resulting noise and vibration transmission through these layer is also high.

All-rubber hoses are also used as suction hoses. Unfortunately without a barrier layer, they exhibit very high refrigerant permeation losses. To counter this, very thick layers of low-barrier elastomers such as butyl, halogenated butyl or BIMS materials are used. Unfortunately, even with very creative filler loading to create a 'tortuous path', the permeation levels cannot reach the low levels of nylon materials. The heavy wall thickness thus result in a large outer diameter hose that consumes more space, adds weight and is costly.

With the change in automotive air conditioning refrigerant from R-134a to R-1234yf, the permeation performance picture changes significantly. For all rubber air conditioning hoses, the permeation rate of R-1234yf increases by as much as twice the permeation rate of R-13a. All rubber hoses become more of a disadvantage in performance because of this high permeation rate. For air conditioning hoses containing nylon (in barrier or veneer constructions), the permeation rate of R-1234yf is reduced by a factor ten or more times lower than the permeation rate of R-134a. Thus, with such low R-1234yf permeation rates, hoses with nylon in the construction (barrier and veneer hoses) could be viewed as 'overdesigned', the material(s) used to construct the barrier or veneer layer(s) do not necessarily need to have such super low permeation performances. This allows use of 'higher permeating' polymers for a permeation barrier layer that would have been unacceptable for use with R-134a hoses. Polymer choices that would have shown very high R-134a permeation losses could now provide R-1234yf permeation losses at levels as low or lower than what existing hoses lose with R-134a.

Thus, there is an ongoing need for air conditioning hoses constructed of material layers with optimal permeation properties, such need met, at least in part, with embodiments according to the following disclosure.

SUMMARY

This section provides a general summary of the disclosure, and is not a necessarily a comprehensive disclosure of its full scope or all of its features.

In some aspects of the disclosure, refrigerant hoses include a permeation inhibiting layer, wherein the permeation inhibiting layer is formed of mixture based upon a polyether-ester block copolymer, a polyamide-polyether block copolymer, or a blend thereof. A tie layer surrounds the permeation inhibiting layer, and the tie layer is based on a butyl rubber. A reinforcing layer surrounds the tie layer, and a cover layer is disposed adjacent the reinforcing layer. In some cases, an innermost rubber tube is disposed inwardly adjacent the permeation inhibiting layer, and the innermost rubber tube is comprised of rubbery polymer. The hoses may have a permeation rate of not greater than 0.0020 g/cm/day of R-1234yf refrigerant.

In some embodiments, the reinforcement layer is a woven polyester fabric, which may be a woven polyethylene terephthalate fabric. The woven polyester fabric may be woven in a 1-over/1-under pattern. The reinforcement layer may be a woven fabric which includes glass fibers, cotton fibers, polyester fibers, or aramid fibers, and such woven fabric may be woven in a 1-over/1-under pattern. Also, in some aspects, the reinforcing layer is a spiral reinforcing layer.

In some embodiments, the refrigerant hose further includes a second tie layer surrounding a first spiral reinforcing layer, and a second spiral reinforcing layer disposed between the cover layer and the second tie layer. In yet other aspects of these embodiments, an innermost rubber tube may be disposed inwardly adjacent the permeation inhibiting layer.

When utilized, the innermost rubber tube may have a thickness which is within the range of 0.025 inch to 0.030 inch. The permeation inhibiting layer may have a thickness which is within the range of 0.002 inch to 0.010 inch. The tie layer(s) may have a thickness which is within the range of 0.02 inch to 0.05 inch. The cover layer may have a thickness which is within the range of 0.03 inch to 0.08 inch. Furthermore, the hose may have an inside diameter which is within the range of 5 mm to 30 mm, or even within the range of 6 mm to 25 mm.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
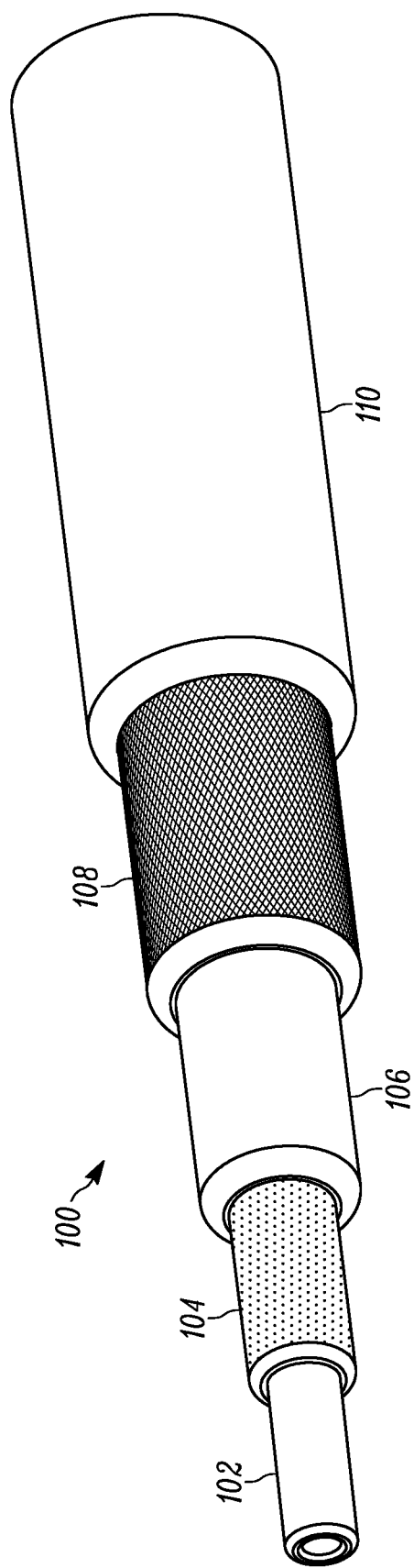
FIG. 1 illustrates a veneer braided hose in a cut away perspective view, in accordance with the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Hose embodiments according to the disclosure generally include a veneer or barrier layer, at least one reinforcement layer, optional reinforcement layer or layers, optional tie layer or layers, an outer cover, and an optional innermost rubber tube. The veneer or barrier layer has a construction which provides a hose having a permeation rate of not greater than 0.001 g/cm/day of R-1234yf refrigerant, with a preferred permeation rate of not greater than 0.0003 g/cm/day of R-1234yf refrigerant. A permeation rate this low is generally considered to be a zero permeation rate. Conventionally, to obtain permeation rates this low, a thin metallic layer is employed in the hose. Alternatively, nylon has been used as well to achieve suitably low permeability, but relative R-1234yf refrigerant, nylon provides unnecessarily low permeation rates. Thus, hose embodiments of the disclosure achieve a very low, to zero, permeation rate without the use of a metallic foil or layer, or nylon layer, within the hose.

With regards to the veneer or barrier layer, replacing the current used nylon material inside the hose 'sandwich' with a softer, yet higher permeating material also lowers the noise transmission. Further, the flex modulus of softer barrier or veneer options can be anywhere from 2 to 20× lower than typical extruded nylon materials. Some suitable, yet non-limiting examples of such softer materials include thermoplastic polyester elastomers based upon polyether-ester block copolymers, such as those supplied under tradename Hytrel®, or thermoplastic elastomers comprised of polyamide and polyether backbone blocks, such as those supplied under tradename Pebax®. By choosing a veneer or barrier layer material that has a reasonable compromise in flexibility versus permeability, a hose could be produced that offers permeation rates much lower than all-rubber constructions while providing good low noise and vibration transmissibility and at a smaller package size (i.e. smaller hose outer diameter and lighter weight).

The thickness of the differing layers of the hose may be linked to the desired characteristics, as excessively thin wall thicknesses or excessively thick wall thicknesses present flexibility or kinking problems or coupling compatibility problems of the final hose composite. For every thousandths of a centimeter increase in the thickness of the hose, the flexibility of the hose decreases. Such hoses will typically have an inside diameter which is within the range of about 5 mm to about 30 mm. In many cases the hoses of this disclosure will have an inside diameter which is within the range of about 6 mm to about 25 mm. In some aspects, the wall thickness of the hose is within the range of 2.72 mm and 3.73 mm. But, as every incremental thickness of the hose decreases the desired properties of the hose, the smallest wall thickness, without a loss of impermeability and creation of kinking problems, is preferred. The preferred wall thickness for a 13 mm ID hose of this invention is normally within the range of about 2.5 mm to 3.5 mm and will typically be about 3.17 mm.

When used, the innermost rubber tube is formed from an elastomeric material which is typically natural rubber or a synthetic rubber. For instance, the elastomeric material utilized in making the core layer can be a chloroprene rubber, a nitrile rubber (NBR), an ethylene-propylene rubber, an ethylene propylene diene monomer rubber (EPDM), a butyl rubber, a chlorosulfonated polyethylene rubber (CSM), an ethylene-acrylic rubber (AEM), a chlorinated polyethylene rubber (CPE), or a brominated isobutylene-paramethylstyrene (BIMS). The innermost rubber tube may also be formed from thermoplastic elastomers or thermoplastic vulcanizates such as polypropylene, polyethylene, or other polyolefins blended with EPDM, NBR, a butyl rubber, or an acrylic rubber. The innermost rubber tube may be comprised of an EPDM rubber or a blend of EPDM rubber with a butyl rubber or a halobutyl rubber and will typically have a thickness which is within the range of 0.025 inch (0.635 mm) to 0.030 inch (0.762 mm).

The permeation inhibiting layer (veneer or barrier) is typically from 0.002 inch (0.05 mm) to 0.01 inch (0.254 mm) thick. For instance, in many cases the permeation inhibiting layer will be from 0.003 inch (0.0762 mm) to 0.005 inch (0.127 mm) thick.

When used, the tie layer(s) is comprised of a butyl rubber or a halobutyl rubber and will typically be from 0.02 inch (0.508 mm) to 0.05 inch (1.27 mm) thick. The butyl rubbers that can be utilized are copolymers of isobutylene and isoprene. The halobutyl rubbers that can be used include bromobutyl rubbers and chlorobutyl rubbers.

The reinforcing layer may be formed by braiding, spiraling, knitting, or helical knitting of yarn. The yarn may be selected from conventional hose reinforcing yarns, such as glass, cotton, polyester, or aramid fibers, or a blend of any of these fibers. The reinforcing layer in the hose of this invention is typically a polyester or aramid fabric which is woven in a 1-over/1-under pattern. Polyester fabric, such as polyethylene terephthalate fabric and polyethylene naphthalate fabric, is typically preferred with polyethylene terephthalate fabric being most typical for economic reasons.

The cover layer employed in embodiments of this disclosure are based on an EPDM rubber and may be from 0.03 inch (0.762 mm) to 0.06 inch (1.524 mm) in thickness.

The various material components utilized in the hose embodiments of this disclosure can be cured with conventional peroxide curatives. For example peroxides such as dicumyl peroxide, α-α-bis(t-butylperoxide)diisopropylbenzene, benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy)hexane, 2,5-dimethyl-2,5-bis(t-butylperoxy)hexyne-3, and n-butyl 4,4-bis(t-butylperoxy) valerate can be employer in curing the rubber components of the hose. The most preferred and commercially available peroxide curatives are Percadox™ 14/40 from Noury Chemical Corporation and Vul-Cup™ from Penwalt Corporation. From 1 to about 10 parts of peroxide are generally utilized based on 100 parts of base polymer. Peroxides are preferred as the curative since they are less sensitive to premature crosslinking (scorch). The rubbery components employed in the hose of this invention can also contain various additives in conventional or suitable amounts. Such additives may include, and are not limited to retardants to prevent an unduly quick cure, antioxidants, processing aids, reinforcing agents and fillers, such as carbon black, silica, and the like.

The adhesive systems useful in adhering the various component layers to other component layers in accordance with this invention are the conventionally known adhesive systems for use with peroxide cured elastomers. For example, maleinized 1,2-polybutadiene resin, and various plasticizers.

Now referencing FIGS. 1 through 4 which depict some hose embodiments in accordance with the disclosure. FIG. 1 illustrates a veneer braided hose 100, in a cut away perspective view. Hose 100 includes an innermost rubber tube 102 which is surrounded by a permeation inhibiting layer 104. Disposed adjacent permeation inhibiting layer 104 is a tie layer 106 which has a reinforcing layer 108 disposed outwardly therefrom. Cover layer 110 is the outermost layer of hose 100.

Figure 2:
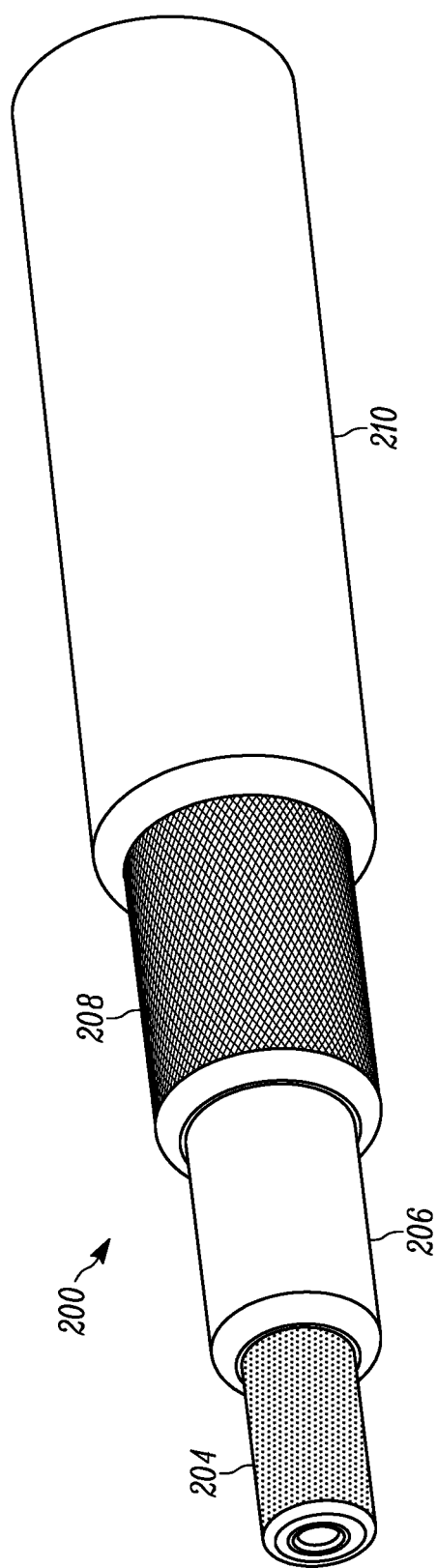
FIG. 2 depicts a barrier braided hose in a cut away perspective view, in accordance with the disclosure.

With reference to FIG. 2, which depicts a barrier braided hose 200, in a cut away perspective view, hose 200 includes an innermost layer which is a permeation inhibiting layer 204 having a tie layer 206 disposed outwardly therefrom. Tie layer 206 is surrounded by a reinforcing layer 208, and cover layer 210 is the outermost layer of hose 200.

Figure 3:
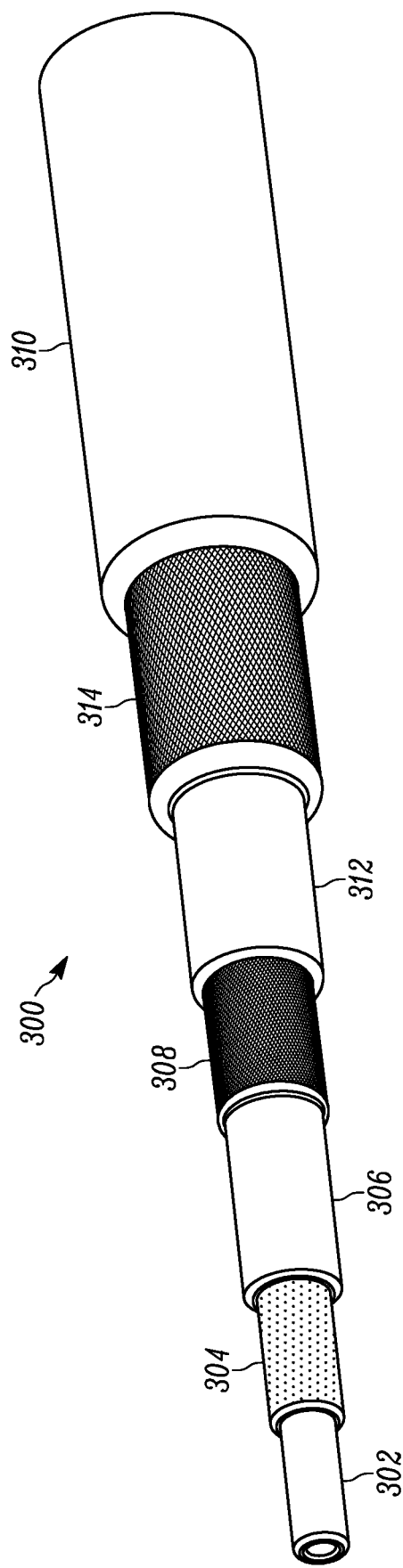
FIG. 3 illustrates a spiral barrier hose in a cut away perspective view, in accordance with the disclosure; and, FIG. 4 depicts a spiral veneer hose in a cut away perspective view, in accordance with the disclosure.

Now referencing FIG. 3 which illustrates a spiral barrier hose 300, in a cut away perspective view. Hose 300 includes an innermost rubber tube 302 which is surrounded by a permeation inhibiting layer 304. Disposed adjacent permeation inhibiting layer 304 is a tie layer 306 which has a spiral reinforcing layer 308 disposed outwardly therefrom. Surrounding the spiral reinforcing layer 308 is a second tie layer 312 which has second spiral reinforcing layer 314 disposed thereupon. Cover layer 310 is the outermost layer of hose 300.

Figure 4:
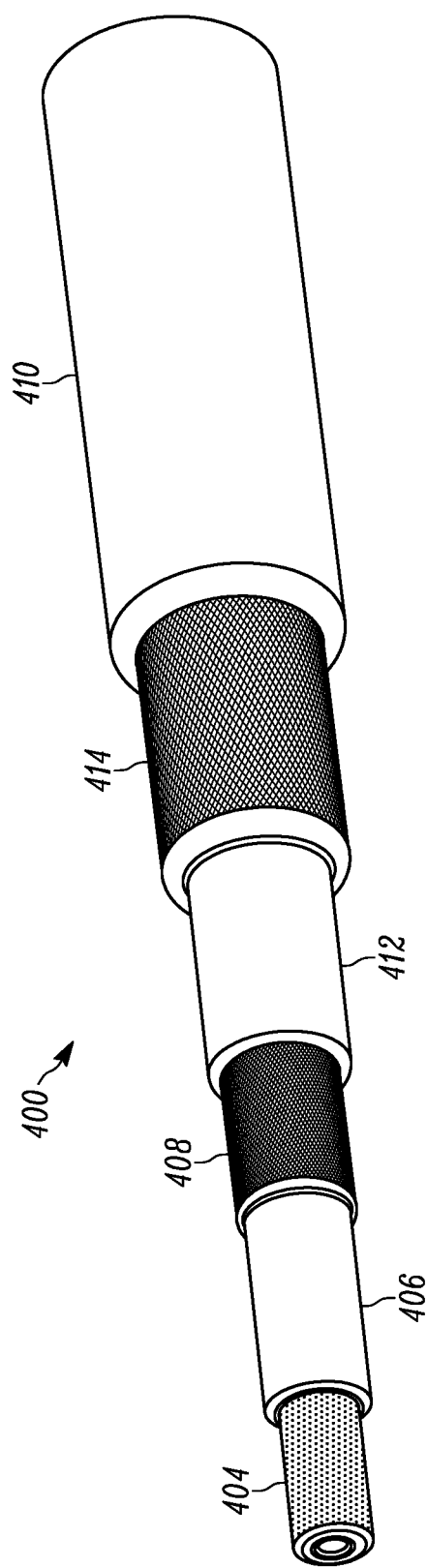

With reference to FIG. 4, which depicts a spiral veneer hose 400, in a cut away perspective view, hose 400 includes an innermost layer which is a permeation inhibiting layer 404 having a tie layer 406 disposed outwardly therefrom. Tie layer 406 is surrounded by a spiral reinforcing layer 408. Surrounding the spiral reinforcing layer 408 is a second tie layer 412 which has second spiral reinforcing layer 414 disposed thereupon. Cover layer 410 is the outermost layer of hose 400.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE NUMERALS (PART OF THE DESCRIPTION)

100 Veneer braided hose
200 Barrier braided hose
300 Spiral barrier hose
400 Spiral veneer hose
102, 302 Innermost rubber tube
104, 204 Permeation inhibiting layer
304, 404 Permeation inhibiting layer
106, 206 Tie layer
306, 406 Tie layer
108, 208 Reinforcing layer
308, 408 Spiral reinforcing layer
110, 210 Cover layer
310, 410 Cover layer
312, 412 Second tie layer
314, 414 Second spiral reinforcing layer

What is claimed is:

1. A refrigerant hose comprising:
   (a) a permeation inhibiting layer comprised of a polyether-ester block copolymer, a polyamide-polyether block copolymer, or a blend thereof and configured to mitigate permeation of R-1234yf refrigerant;
   (b) a tie layer which surrounds the permeation inhibiting layer, wherein the tie layer is comprised of a butyl rubber;
   (c) a reinforcing layer surrounding the tie layer, and,
   (d) a cover layer which is disposed adjacent the reinforcing layer.

2. The refrigerant hose according to claim 1 further comprising an innermost rubber tube disposed inwardly adjacent the permeation inhibiting layer, wherein the innermost rubber tube is comprised of rubbery polymer.

3. The refrigerant hose according to claim 2 wherein the innermost rubber tube is comprised of EPDM rubber, a blend of EPDM with butyl rubber, or a blend of EPDM rubber with halobutyl rubber.

4. The refrigerant hose according to claim 1, wherein the cover layer is comprised of ethylene-propylene-diene monomer rubber.

5. The refrigerant hose according to claim 1, wherein the reinforcement layer is a woven polyester fabric.

6. The refrigerant hose according to claim 5, wherein the woven polyester fabric is a woven polyethylene terephthalate fabric.

7. The refrigerant hose according to claim 5, wherein the woven polyester fabric is woven in a 1-over/1-under pattern.

8. The refrigerant hose according to claim 1, wherein the reinforcement layer is a woven fabric which is comprised of glass fibers, cotton fibers, polyester fibers, or aramid fibers.

9. The refrigerant hose according to claim 8, wherein the woven fabric is woven in a 1-over/1-under pattern.

10. The refrigerant hose according to claim 1, wherein the cover layer comprises pin-pricks.

11. The refrigerant hose according to claim 1, wherein the reinforcing layer is a spiral reinforcing layer, and wherein the refrigerant hose further comprises a second tie layer surrounding the spiral reinforcing layer, and a second spiral reinforcing layer disposed between the cover layer and the second tie layer.

12. The refrigerant hose according to claim 11 further comprising an innermost rubber tube disposed inwardly adjacent the permeation inhibiting layer, wherein the innermost rubber tube is comprised of rubbery polymer.

13. The refrigerant hose according to claim 1, wherein the hose has a permeation rate of not greater than 0.0020 g/cm/day of R-1234yf refrigerant.

14. The refrigerant hose according to claim 2, wherein the innermost rubber tube has a thickness which is within the range of 0.025 inch to 0.030 inch.

15. The refrigerant hose according to claim 12, wherein the innermost rubber tube has a thickness which is within the range of 0.025 inch to 0.030 inch.

16. The refrigerant hose according to claim 1, wherein the permeation inhibiting layer has a thickness which is within the range of 0.002 inch to 0.010 inch.

17. The refrigerant hose according to claim 1, wherein the tie layer has a thickness which is within the range of 0.02 inch to 0.05 inch.

18. The refrigerant hose according to claim 1, wherein the cover layer has a thickness which is within the range of 0.03 inch to 0.08 inch.

19. The refrigerant hose according to claim 1, wherein the hose has an inside diameter which is within the range of 5 mm to 30 mm.

20. The refrigerant hose according to claim 19, wherein the hose has an inside diameter which is within the range of 6 mm to 25 mm.

* * * * *